(12) United States Patent
Brown et al.

(10) Patent No.: US 8,307,048 B2
(45) Date of Patent: Nov. 6, 2012

(54) NETWORK SYSTEM WITH INITIATOR SUBNETWORK COMMUNICATION TO TARGET SUBNETWORK COMMUNICATION INCLUDING FIBRE CHANNEL OVER ETHERNET TO FIBRE CHANNEL OVER INTERNET PROTOCOL CONVERSION

(75) Inventors: Aaron C Brown, Austin, TX (US); Scott M Carlson, Tucson, AZ (US); Daniel G Eisenhauer, Austin, TX (US); Roger G Hathorn, Tucson, AZ (US); Jeffrey W Palm, Rochester, MN (US); Renato J Recio, Austin, TX (US); Gregory J Tevis, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 199 days.

(21) Appl. No.: 12/173,141

(22) Filed: Jul. 15, 2008

(65) Prior Publication Data

US 2010/0017497 A1   Jan. 21, 2010

(51) Int. Cl.
*G06F 15/16* (2006.01)
*H04L 12/28* (2006.01)
(52) U.S. Cl. .................. 709/217; 709/230; 370/389
(58) Field of Classification Search .................. 709/217, 709/230; 370/389
See application file for complete search history.

(56) References Cited

U.S. PATENT DOCUMENTS

| | | | |
|---|---|---|---|
| 5,491,817 A | 2/1996 | Gopal | |
| 6,292,838 B1 * | 9/2001 | Nelson | 709/236 |
| 6,424,654 B1 | 7/2002 | Daizo | |
| 6,765,881 B1 * | 7/2004 | Rajakarunanayake | 370/256 |
| 7,043,578 B2 | 5/2006 | Hufferd | |
| 2002/0114328 A1 * | 8/2002 | Miyamoto et al. | 370/389 |
| 2004/0003292 A1 | 1/2004 | Kato | |
| 2004/0030806 A1 | 2/2004 | Pandya | |
| 2004/0267692 A1 | 12/2004 | Jones | |
| 2005/0025075 A1 | 2/2005 | Dutt | |
| 2005/0141419 A1 | 6/2005 | Bergamasco | |
| 2005/0154794 A1 | 7/2005 | Deshpande | |

(Continued)

FOREIGN PATENT DOCUMENTS

JP   2005064901 A   3/2005

(Continued)

OTHER PUBLICATIONS

Cheriton—"Decentralizing a Global Naming Service for Improved Performance and Fault Tolerance", Proc. IEEE ASICON05 (2005).

(Continued)

*Primary Examiner* — Joseph Avellino
*Assistant Examiner* — Jeong S Park
(74) *Attorney, Agent, or Firm* — Matt Talpis; Mark P Kahler

(57) ABSTRACT

A network system supports multiple network communication protocols. An Ethernet component gateway in a Fiber Channel over Ethernet (FCoE) initiator system converts FCoE data packets from host devices to Fiber Channel over Internet Protocol (FCIP) data packets for transmission to a Storage Area Network (SAN) target system. The SAN target system may include a target Fiber Channel (FC) storage device and a SAN component gateway. The SAN component gateway converts FCIP data packets to SAN data packets for use by the target FC storage device. The SAN data packets may be either FC protocol data packets or FCoE protocol data packets. The SAN target system may provide for discovery of target FC storage device adapter information.

8 Claims, 7 Drawing Sheets

200
NETWORK SYSTEM

U.S. PATENT DOCUMENTS

| | | |
|---|---|---|
| 2005/0192967 A1 | 9/2005 | Basavaiah |
| 2005/0249247 A1 | 11/2005 | Shanley |
| 2006/0087989 A1 | 4/2006 | Gai |
| 2006/0098589 A1 | 5/2006 | Kreeger |
| 2006/0098681 A1 | 5/2006 | Cafiero |
| 2006/0101140 A1 | 5/2006 | Gai |
| 2006/0159032 A1 | 7/2006 | Ukrainetz |
| 2006/0251067 A1 | 11/2006 | DeSanti |
| 2007/0002883 A1 | 1/2007 | Edsall |
| 2007/0112931 A1 | 5/2007 | Kuik |
| 2008/0028096 A1 | 1/2008 | Henderson |
| 2008/0159260 A1* | 7/2008 | Vobbilisetty et al. ......... 370/351 |
| 2009/0041046 A1 | 2/2009 | Hirata |

FOREIGN PATENT DOCUMENTS

| | | |
|---|---|---|
| WO | 2009085536 A2 | 7/2009 |

OTHER PUBLICATIONS

Cisco—"Fibre Channel over IP Design Using the MDS 9000 Family of Multilayer Switches", Cisco Systems Inc (2007).

EMC—"MirrowView using Fibre Channel over IP with CNT Edge Routers", EMC (Oct. 19, 2003).

FibreChannel—"Overview of the Technology"—(dnld. From www.fibrechannel.org on Apr. 10, 2007).

FibreChannel2—"Fibre Channel—Generic Services, Rev 9.00"—Global Engineering (Jan. 8, 2007).

GILLIES—"The Clearinghouse: Anti Entropy . . . "—University of British Columbia (Apr. 18, 2003).

IBM—Scheme for Eliminating Ambiguities in Fibre Channel Port Names, IP.com (Apr. 18, 2007).

Maxcer—"New Network Standard Could Converge Fiber, Ethernet", Tech News (Apr. 6, 2007).

MUSE—"Vendors Propose Fibre Channel Over Ethernet Standard", Internet News (Apr. 5, 2007).

Oppen—"A Decentralized Agent for Locating Named Objects in a Distributed Environment", ACM (1983).

Seeber—"Storage Area Networking"—Resolution (Sep. 2006).

* cited by examiner

NETWORK SYSTEM EMPLOYING INITIATOR GROUP TO TARGET GROUP DATA PACKET PROTOCOL CONVERSION METHOD

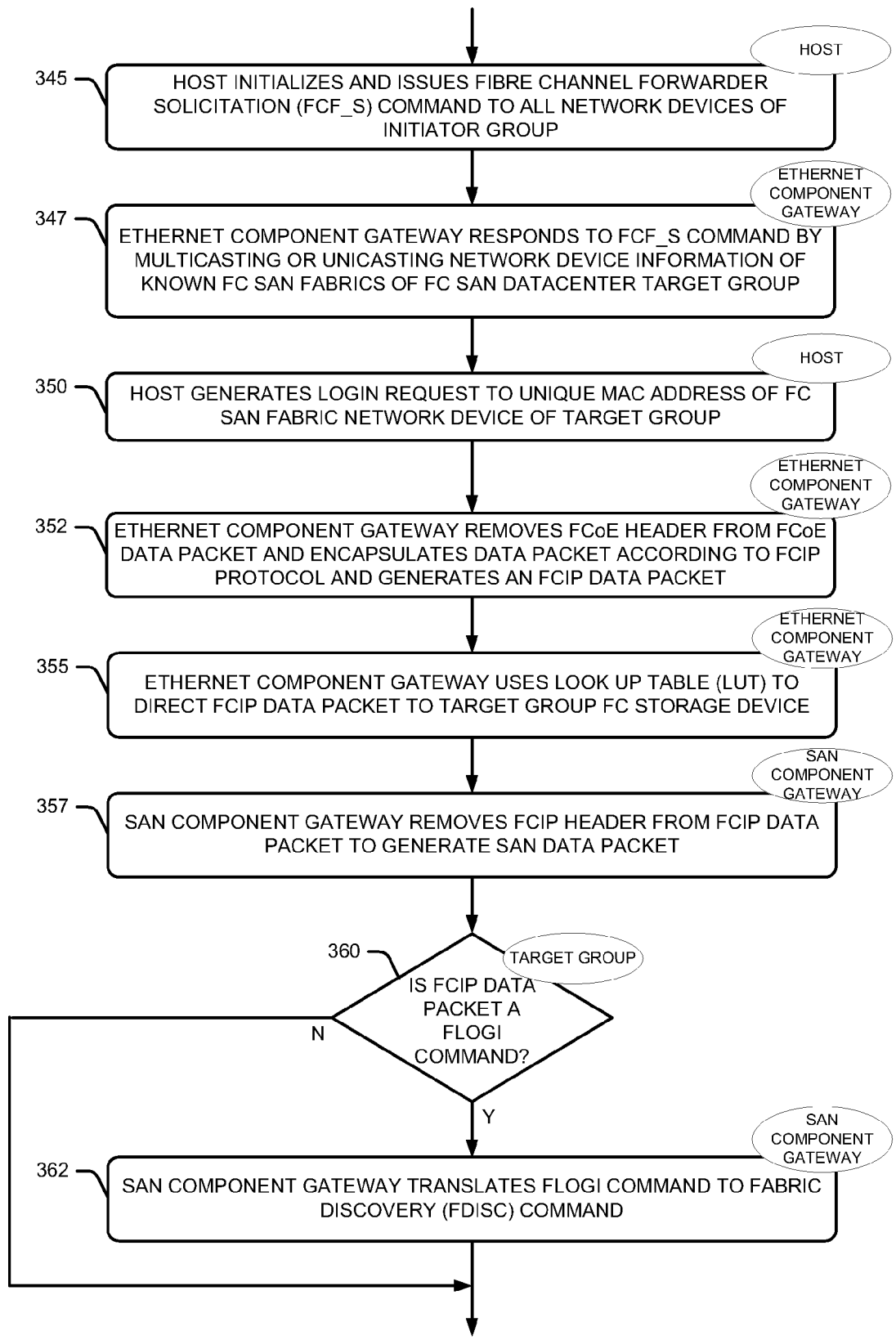

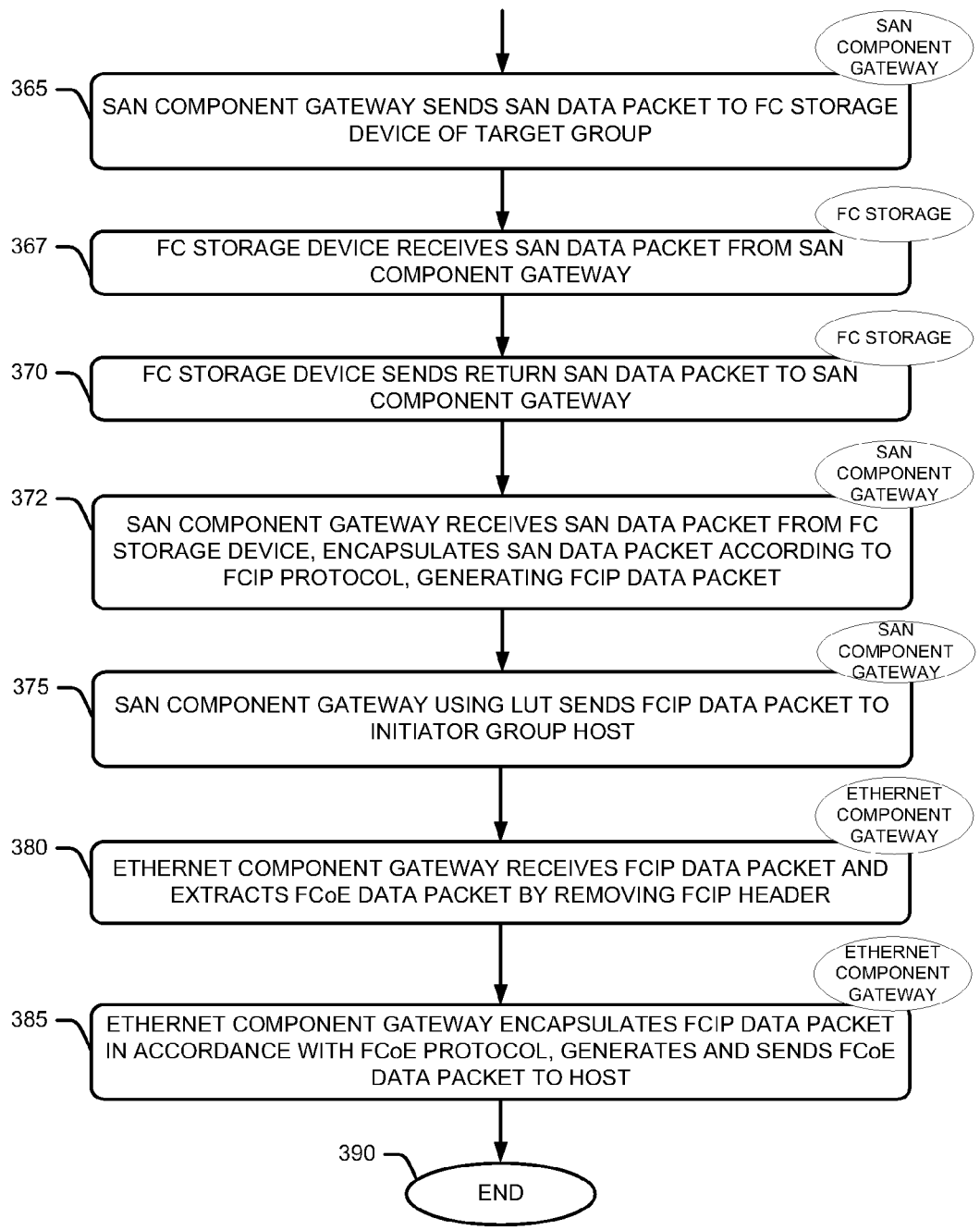

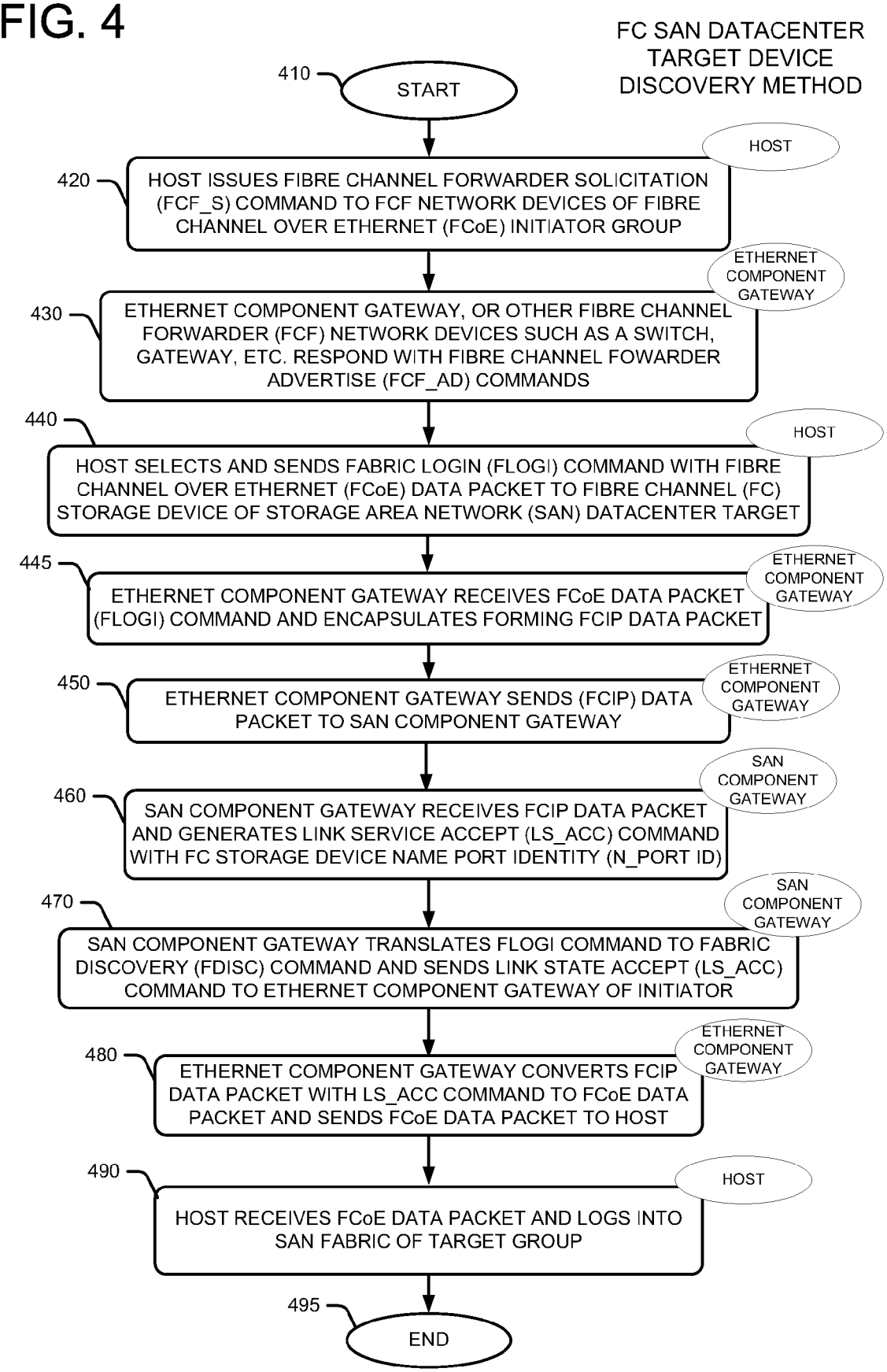

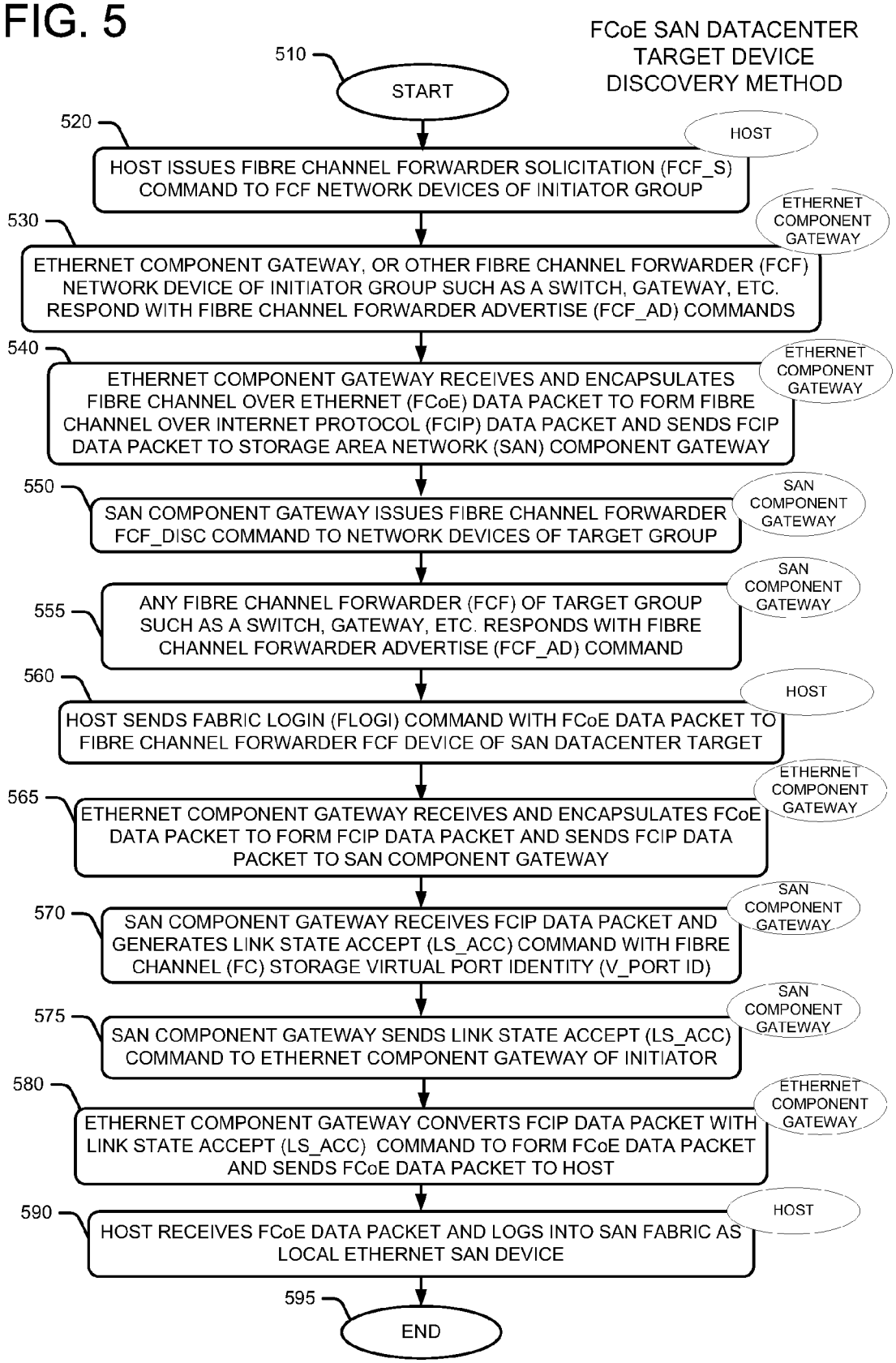

NETWORK SYSTEM WITH INITIATOR SUBNETWORK COMMUNICATION TO TARGET SUBNETWORK COMMUNICATION INCLUDING FIBRE CHANNEL OVER ETHERNET TO FIBRE CHANNEL OVER INTERNET PROTOCOL CONVERSION

TECHNICAL FIELD OF THE INVENTION

The disclosures herein relate generally to network systems, and more particularly, to Fibre Channel over Internet Protocol (FCIP) and Fibre Channel over Ethernet (FCoE) communication in network systems.

BACKGROUND

A network system may include multiple servers, clients, or other network devices for processing, handling, communicating or otherwise manipulating network information. For example, multiple client network systems may connect to a server network system over a communication network or pathway. Server network systems deliver information and software to other client network systems that link through a network system, such as a local area network (LAN), the Internet, or other communications pathway. Server network systems handle requests for data, email, file transfer, and other network services from client network systems.

A server network system may be a file server system or storage area network (SAN) datacenter that stores files for use by other network devices. A server network system may also be a print server network system that manages one or more printers for other network devices. Server network systems may also include other special purpose server network systems. When employing a multitasking operating system, a single server network system may manage multiple programs and thus simultaneously handle multiple server functions such as Internet communication, database management, email, and other server functions. Client network systems, such as remote office network systems, may send data requests in the form of frames or data packets to one or more server networks systems. Ethernet data packets or frames provide a standard data format for data transmissions from network device to network device in a network system.

Although Ethernet protocols are common in network systems, other communication protocols such as Fibre Channel (FC) protocols provide other communication approaches. Fibre Channel protocols provide a methodology for communicating between server network systems and client network systems. Mixing Ethernet and Fibre Channel protocols provides opportunities for utilizing the special capabilities of each. For example, Fibre Channel network devices may provide significant improvement in the data storage and data retrieval capabilities of a network system. Fibre Channel data packets are not identical in structure to Ethernet data packets and thus require translation mechanisms to function properly within a partial or predominantly Ethernet protocol network system. The term "Fibre Channel over Internet Protocol" or "FCIP" as used herein means any protocol or any system that transmits Fibre Channel frames or Fibre Channel data packets directly over an Internet Protocol (IP) network. "Fibre Channel over Ethernet" or "FCoE" is another type of Fibre Channel protocol. FCoE refers to a protocol or system that transmits Fibre Channel frames or Fibre Channel data packets over an Ethernet network.

SUMMARY

In one embodiment, a method of communicating is disclosed that includes generating, by a first host network device in a Fibre Channel Over Ethernet (FCoE) initiator system, an FCoE data packet. The method also includes designating, by the first host network device in the FCoE initiator system, a target Fibre Channel (FC) storage device in a storage area network (SAN) target system for the FCoE data packet. The method further includes converting, by an Ethernet component gateway in the FCoE initiator system, the FCoE data packet into an FCIP data packet. The method still further includes transmitting, by the Ethernet component gateway, the FCIP data packet to the SAN target system via an IP data pathway. The method also includes receiving, by a SAN component gateway in the SAN target system, the FCIP data packet. The method further includes extracting, by the SAN component gateway, a SAN data packet from the FCIP data packet, thus providing an extracted SAN data packet. The method also includes sending, by the SAN component gateway, the extracted SAN data packet to the target FC storage device.

In another embodiment, a network system is disclosed that includes a Fibre Channel Over Ethernet (FCoE) initiator system including a first host network device that generates an FCoE data packet. The FCoE initiator system includes an Ethernet component gateway that converts the FCoE data packet into an FCIP data packet. The network system includes a storage area network (SAN) target system including a SAN component gateway and a target FC storage device. The network system also includes an internet protocol (IP) data pathway that couples the FCoE initiator system to the SAN target system and conveys the FCIP data packet from the Ethernet component gateway of the FCoE initiator system to the SAN component gateway of the SAN target system. The FCoE data packet is targeted at the target FC storage device. The SAN component gateway receives the FCIP data packet and extracts a SAN data packet from the FCIP data packet, thus providing an extracted SAN data packet to the target FC storage device.

BRIEF DESCRIPTION OF THE DRAWINGS

The appended drawings illustrate only exemplary embodiments of the invention and therefore do not limit its scope because the inventive concepts lend themselves to other equally effective embodiments.

FIGS. 3A-3C show a flow chart that depicts the Fibre Channel over Internet Protocol (FCIP) to Fibre Channel over Ethernet (FCoE) Protocol data packet conversion methodology of FIG. 2.

FIG. 4 is a flow chart that depicts a network system device discovery method within a Fibre Channel (FC) Storage Area Network (SAN) datacenter (Target) of the network system of FIG. 2.

FIG. 5 is a flow chart that depicts a network device discovery method within a Fibre Channel over Ethernet (FCoE) Storage Area Network (SAN) datacenter (Target) of the network system of FIG. 2.

DETAILED DESCRIPTION

Ethernet protocol refers to one type of network system protocol that a local area network (LAN) may employ. A conventional specification for a LAN often employs Ethernet protocols. Ethernet is a frame-based networking technology for use by network systems, such as LANs. The Ethernet standard or protocol provides the hardware and software interface specifications for network devices in a network system. Ethernet also provides for connection of a network system to the Internet via a cable modem, a DSL modem, or other communications interface. The IEEE 802.3 standard defines the basic structure and protocol of Ethernet network systems. Ethernet defines multiple wiring and signalling standards for use by physical devices of a network fabric, such as routers, switches, gateways, hubs, and other devices. A network fabric is the physical infrastructure of a network that enables the connection of one network device to another network device. Network fabrics typically include connective cabling such as twisted pair wiring, coaxial cable, fiber optic cable or other connectivity structures. Network fabrics may also include network switches, network routers, networks gateways, network hubs and other connective network devices that share a common bandwidth and network protocol such as Ethernet, Fibre Channel, or other network protocol.

Ethernet network devices transmit data with Ethernet frames that are commonly known as Ethernet data packets. Ethernet data packets may be variable length data transmissions. Each Ethernet data packet includes a header with the addresses of the source and destination network devices, a data area, and a trailer that includes error correction data. Other network protocols such as "Internet Protocol" (IP) and "Internetwork Packet Exchange" (IPX) may fragment longer data transmissions through special use of Ethernet frames or data packets. In a similar process, Fibre Channel frames or data packets provide the data transmission mechanism for the Fibre Channel protocol. Fibre Channel is currently a multi-gigabit network technology that network systems employ primarily for use by storage devices. Fibre Channel is a standard in the T11 Technical Committee of the International Committee for Information Technology Standards (INCITS) and the American National Standards Institute (ANSI). Despite the name, Fibre Channel signals may operate over copper wire as well as fiber optic cables. Fibre Channel Protocol (FCP) is the interface protocol of the Small Computer System Interface (SCSI) in a Fibre Channel network system.

Figure 1:
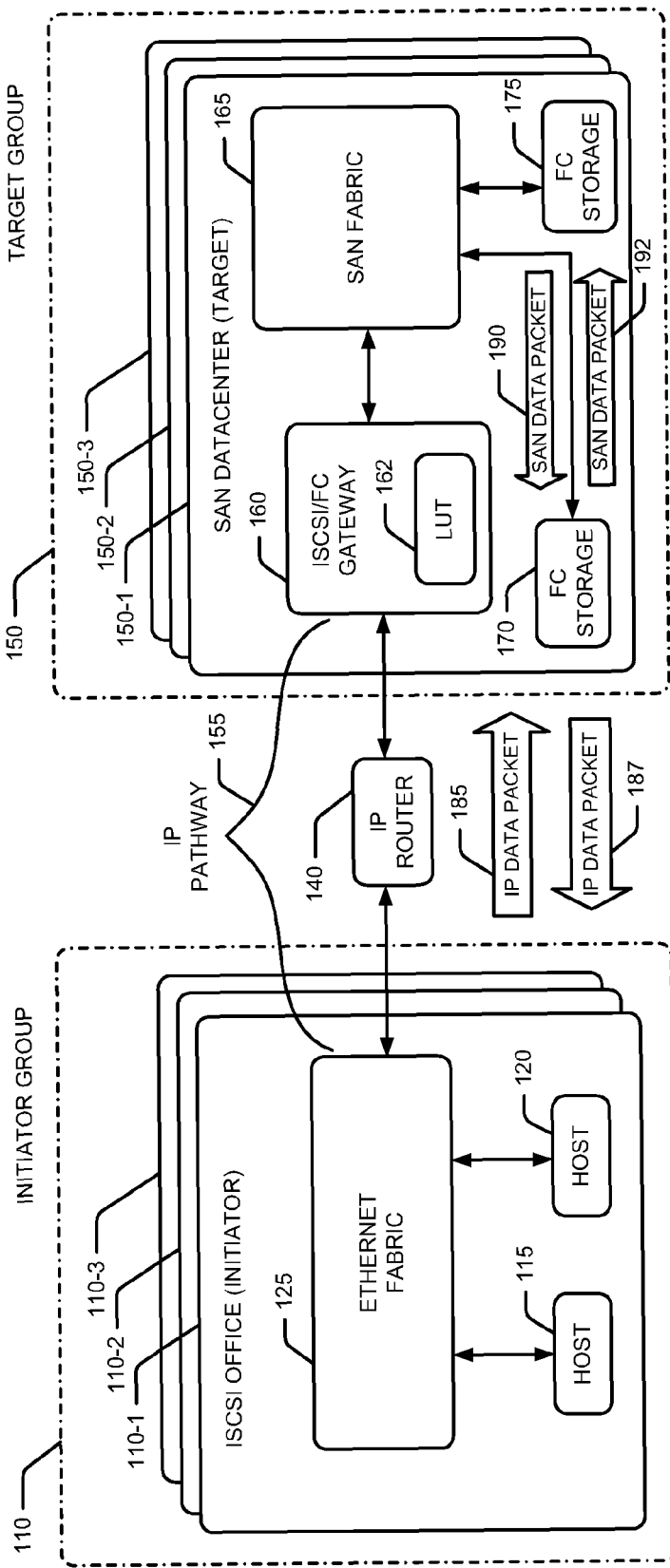
FIG. 1 is a block diagram of a conventional network system with "Internet Small Computer System Interface" ISCSI office (initiator) communications to a "Storage Area Network" SAN datacenter (target).

FIG. 1 depicts a simplified block diagram of a conventional network system 100. Conventional network system 100 includes an "Internet Small Computer System Interface" (ISCSI) office initiator group 110. Initiator group 110 may be a subnetwork (subnet) or client network system of larger conventional network system 100. ISCSI protocol is a conventional protocol that allows initiating network devices to send "Small Computer System Interface" (SCSI) data across the Internet to target storage devices of a different network system or subnet of conventional network system 100. Initiator group 110 may include multiple ISCSI office initiator subnets, namely initiator 110-1, 110-2, 110-3, etc. Each initiator 110-1, 110-2, 110-3, etc., of initiator group 110 may include network devices that initiate data communications. For example, initiator 110-1 includes a host 115 and a host 120 that provide initiation of network communications. Initiator 110-1 acts as an initiator of a communication with a target network device. In one example, host 115 and host 120 may be servers that a subnet such as initiator group 110 employ. Host 115 and host 120 each couple to an Ethernet fabric 125. Ethernet fabric 125 may include any number of interconnecting Ethernet devices such as Ethernet switches, Ethernet routers, Ethernet hubs, etc. In one example, Ethernet fabric 125 may include only Ethernet wiring or cable interconnects and thus no discrete Ethernet network devices.

Ethernet fabric 125 couples to an IP router 140. IP router 140 employs an IP communications capability. More specifically, IP router 140 exhibits the ability to communicate across the Internet or IP communication pathways via ISCSI, IP, FC or other protocols. IP router 140 couples Ethernet fabric 125 of initiator group 110 to a SAN datacenter target group 150 that includes a target network device such as FC storage 170 or FC storage 175. Target group 150 may act as a target for the communication that network devices of initiator group 110 initiate. Ethernet fabric 125 couples directly to an "Internet Small Computer System Interface and Fibre Channel" (ISCSI/FC) gateway 160 within target group 150. An IP pathway 155 includes IP router 140 and IP communication pathways between Ethernet fabric 125 and ISCSI/FC gateway 160. ISCSI/FC gateway 160 employs a look up table LUT 162 that may provide mapping in the form of table entries for data packet routing within conventional network system 100. Conventional network system 100 employs IP router 140 to manage the connectivity of IP pathways between initiator group 110 and target group 150. Target group 150 may be a server subnetwork or subnet within the larger conventional network system 100. Target group 150 may include multiple SAN datacenter targets, namely target 150-1, 150-2, 150-3, etc. Each target 150-1, 150-2, 150-3, etc., of target group 150 may include network devices that initiator group 110 targets for data communications. For example, initiator group 110 includes host 115 and host 120 that initiate network communications with storage devices of target group 150.

ISCSI/FC gateway 160 receives and interprets data packet communications from IP router 140 and converts those data packets for use in target group 150. For example, ISCSI/FC gateway 160 may convert a particular data packet that host 115 generates from ISCSI protocol to FC protocol for use within target group 150. In another example, IP router 140 may provide IP pathway connectivity between multiple ISCSI office initiators, such as initiator 110-1, 110-2, 110-3, etc. IP router 140 may also provide IP pathway connectivity between multiple SAN datacenter targets, such as target 150-1, 150-2, 150-3, etc. ISCSI/FC gateway 160 reads and interprets network communications from IP router 140 and converts the transmission of any data packet frames for use in target group 150.

ISCSI/FC gateway 160 couples to a SAN fabric 165. SAN fabric 165 may include any number of interconnecting network devices such as network switches, network routers, network hubs, etc. In one example, SAN fabric 165 may include only network wiring or cable interconnects and thus no discrete network devices. SAN fabric 165 couples to a "Fibre Channel" or FC storage 170, and an FC storage 175. FC storage devices, such as FC storage 170 and FC storage 175 provide information in the form of data packets to host devices, such as host 115, and host 120. Host devices of initiator group 110 may initiate data read and write requests to target group 150 FC storage devices, such as FC storage 170 and FC storage 175.

Conventional network system 100 employs network devices that provide communication pathways and interface controls for data packet communications between initiator group 110 devices and target group 150 devices. The primary source of data communication is data packet or frame transmission between network devices of conventional network system 100. In one example wherein host 115 initiates a communication, host 115 communicates to Ethernet fabric 125 and to IP router 140 with an IP data packet 185. IP data packet 185 may be in the form of an ISCSI protocol data packet. In the opposite direction wherein FC storage 170 responds to a communication from initiator group 110, IP router 140 communicates through Ethernet fabric 125 and to host 115 with an IP data packet 187. IP data packet 187 may be in the form of an ISCSI protocol data packet.

IP router 140 provides the IP pathway communication routing for data packet communication between initiator group 110 and target group 150. In one example, wherein host 115 initiates a communication, conventional network system 100 employs IP data packet 185 for communication between Ethernet fabric 125 and ISCSI/FC gateway 160. In the opposite direction, wherein FC storage 170 responds to a communication from initiator group 110, ISCSI/FC gateway 160 communicates through IP router 140 to Ethernet fabric 125 with IP data packet 187. Within target group 150, and more specifically within target 150-1, ISCSI/FC gateway 160 communicates through SAN fabric 165 to FC storage 170 with a SAN data packet 190. FC storage 170 communicates through SAN fabric 165, of target 150-1, to ISCSI/FC gateway 160 with a SAN data packet 192. In one example, SAN data packet 190 and SAN data packet 192 are in the form of Fibre Channel protocol data packets.

In one communication direction wherein host 115 is the initiator and FC storage 170 is the target, ISCSI/FC gateway 160 converts IP data packet 185 to SAN data packet 190 for use in target 150-1. In this example, host 115 may generate IP data packet 185. IP router 140 routes IP data packet 185 to target 150-1, or more specifically, to ISCSI/FC gateway 160. ISCSI/FC gateway 160 converts IP data packet 185 to an FC network data packet, such as SAN data packet 190, for use within target 150-1. ISCSI/FC gateway 160 sends SAN data packet 190 through SAN fabric 165 to one of multiple FC storage devices, such as FC storage 170.

In another example, target group 150 responds to initiator group 110 communication requests. In that case, FC storage 170 sends data and host 115 receives data. Moreover, ISCSI/FC gateway 160 provides the methodology and apparatus to convert an FC data packet, such as SAN data packet 192 to an IP network data packet, such as IP data packet 187. In this example, FC storage 170 may generate SAN data packet 192. ISCSI/FC gateway 160 generates and sends a resultant IP data packet, such as IP data packet 187, to IP router 140. IP router 140 sends IP data packet 187 to Ethernet fabric 125. Ethernet fabric 125 sends IP data packet 187 to one of multiple host server devices, such as host 115.

Conventional network system 100 employs ISCSI/FC gateway 160 to convert, translate, or otherwise modify network data packets. ISCSI/FC gateway 160 modifies network data packets and sends or routes such modified data packets to the proper network device of conventional network system 100 in accordance with the proper network protocol. Communication or transfer of network data from Ethernet devices such as host 115 to FC devices such as FC storage 170 requires ISCSI, IP, FC or other network protocol data packet translation.

A MAC (media access control) Address or MAC Address is a unique code that operating system (OS) software, device driver software, or other software or hardware assigns to each unique network device in a network system. More specifically, OS software or device driver software may permanently assign a unique MAC Address to each hardware device such as a wireless card, network adapter, or other network device requiring network data communications. In another example, manufacturers may pre-assign a factory unique MAC Address to a network device such as an Ethernet network card. A MAC Address typically includes 48 bits or six pairs of numbers or letters, as in A0:84:E2:42:CE:12. The unique MAC Address identifier of each network device provides server network systems with an authentication ability that determines which network device may communicate with another network device. In a typical network system such as a LAN or other network system, the MAC Address is a unique hardware number that associates with the network device (such as a server network system).

Networking technologies and protocols use a variety of methods to identify ports. TCP/IP uses port numbers to identify application processes or network services. TCP data packet headers and "user datagram protocol" (UDP) data packet headers include such port numbers. In Ethernet protocol, 48 bit MAC addresses uniquely identify ports. Each Ethernet frame includes a source and destination MAC address in a frame header. Fibre Channel protocol identifies ports with respective 24 bit "node port identifiers" (N_PORT_IDs). Thus, a variety of methods may uniquely identify entities within networks. A data packet initiator or originator uses such port identifiers to address data packets. Network devices such as switches and routers use these identifiers to route data packets to the proper destination. Port identifiers are an important part of network systems but vary according to the technology and protocol that a particular network system employs. A network system may provide better performance by allowing Fibre Channel data packets and Ethernet data packets to communicate between network systems, such as office initiator networks and SAN datacenter target networks.

Figure 2:
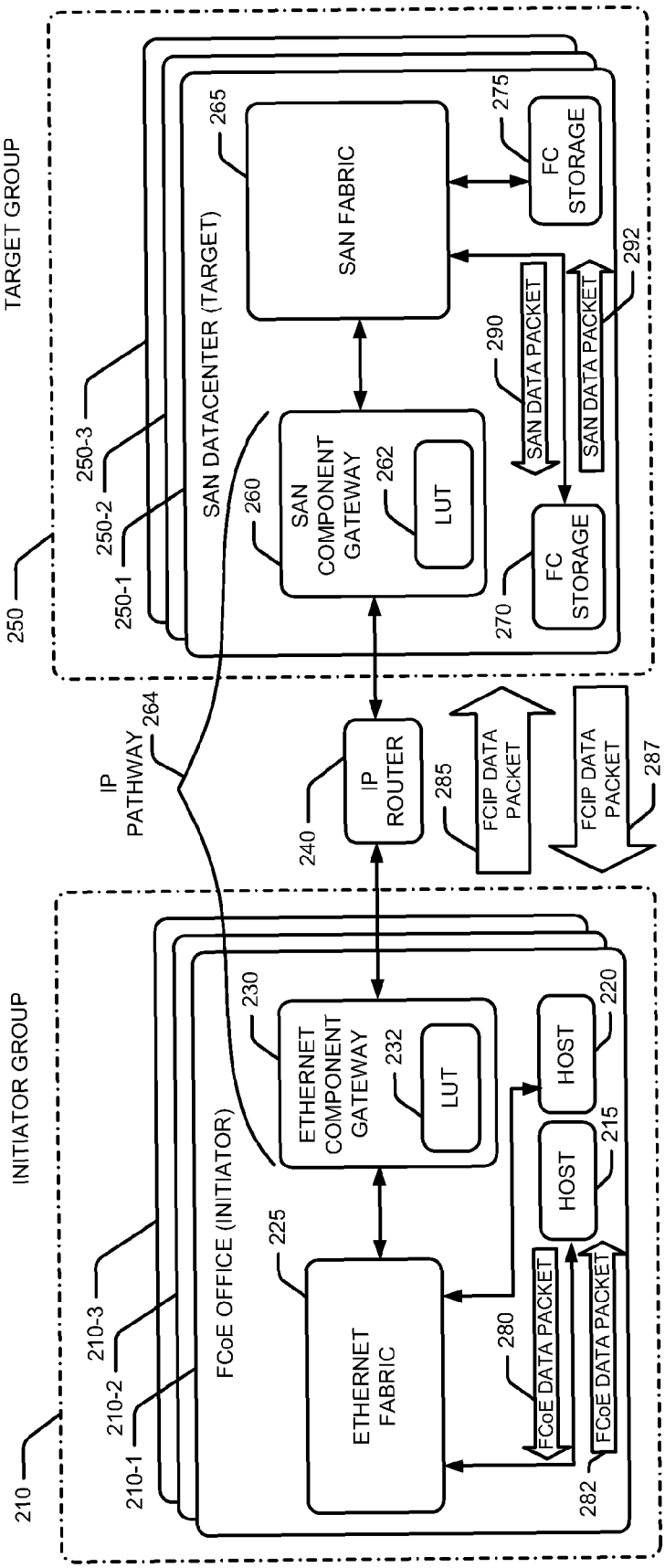
FIG. 2 is a block diagram of a network system employing the disclosed Fibre Channel over Internet Protocol (FCIP) to Fibre Channel over Ethernet (FCoE) conversion capability and methodology.

FIG. 2 shows a simplified block diagram of a representative network system 200 that employs the disclosed data packet conversion methodology to send Fibre Channel data packets over an IP pathway. In one embodiment, network system 200 employs an initiator group 210 that includes FCoE protocol network devices. In one embodiment, initiator group 210 may be an FCoE protocol office group or subnetwork, such as a client network system of much larger network system 200. In one example, initiator group 210 includes multiple FCoE office initiators, namely initiators 210-1, 210-2, 210-3, etc. Each initiator 210-1, 210-2, 210-3, etc., of initiator group 210 may include network devices that initiate data communications and transmissions. For example, initiator 210-1 includes a host network device or host 215 that initiates network communications. Initiator 210-1 also includes a host network device or host 220 that may initiate network communications. In one embodiment, host 215 and host 220 may be servers that an office facility such as initiator group 210 employs. Network devices of initiator 210-1 may couple to network devices of initiator 210-2, initiator 210-3, etc., through network connections (not shown) of initiator group 210. Host 215 and host 220 each couple to an Ethernet fabric 225. Ethernet fabric 225 includes any number of interconnecting Ethernet devices such as Ethernet switches, Ethernet routers, Ethernet hubs, etc. In one example, Ethernet fabric 225 may include only Ethernet wiring or cable interconnects and thus no discrete Ethernet network devices. Ethernet fabric 225 couples to an Ethernet component gateway 230.

Ethernet component gateway 230 employs an IP pathway communications capability. More specifically, Ethernet component gateway 230 includes the ability to communicate across the Internet or IP communication pathways with protocols that may include Fibre Channel over IP (FCIP) communications. In one embodiment, Ethernet component gateway 230 reads and interprets FCoE data packets that a network device such as host 215 generates. Ethernet component gateway 230 may convert the FCoE data packets into an FCIP data form appropriate for transmission across IP pathways. Ethernet component gateway 230 employs a "look up table" LUT 232 that may provide mapping in the form of table entries for data packet routing within network system 200.

Ethernet component gateway 230 couples to an IP router 240 that provides the IP interface for initiator group 210 communications across IP pathways.

Fibre Channel over Ethernet (FCoE) protocols may not provide connectivity across multiple IP subnets. In other words the FCoE protocol does not interconnect a device of a server network system to another node or device across multiple IP subnets. To solve this problem, IP router 240 or other similar networking device provides the interconnectivity between subnets or subnetworks. A subnet is a smaller portion of a larger network system that a specific network address range defines. A subnet may correspond to the network system of an organization or facility of a large business. Networks may define a subnet with a network ID or subnet ID. Initiator group 210 is an example of one such subnet of larger network system 200.

IP router 240 couples Ethernet component gateway 230 of initiator group 210 to a target group 250 such as a SAN datacenter group. In one example, IP router 240 couples Ethernet component gateway 230 to a SAN component gateway 260 in target group 250. SAN component gateway 260 employs a look up table LUT 262 that may provide mapping in the form of table entries for data packet routing within network system 200. Network system 200 employs IP router 240 to manage the connectivity of IP pathways between initiator group 210 and target group 250. In one embodiment, network system 200 employs an IP pathway 264 that provides communication capability between initiator group 210 and target group 250. IP pathway 264 includes Ethernet component gateway 230, IP router 240, and SAN component gateway 260. IP pathway 264 includes the IP communication pathways between IP router 240 and Ethernet component gateway 230. IP pathway 264 includes the IP communication pathways between IP router 240 and SAN component gateway 260. Target group 250 may be a storage network system of larger network system 200. Target group 250 may include multiple SAN datacenter targets, namely targets 250-1, 250-2, 250-3, etc. Each target 250-1, 250-2, 250-3, etc., of target group 250 may include network devices that initiator group 210 devices target for data transmissions. For example, initiator group 210 includes host 215 and host 220 that provide initiation of network communications to storage devices of target group 250. Network devices of network system 200 may communicate to other network devices of target group 250, such as those of targets 250-2, 250-3, etc., through network pathways not shown.

Ethernet component gateway 230 receives and interprets data packet communications from IP router 240 and converts those data packets for use in initiator group 210. In one embodiment, IP router 240 may provide IP pathway connectivity between multiple FCoE office initiators, such as initiators 210-1, 210-2, 210-3, etc., and multiple SAN datacenter targets, such as targets 250-1, 250-2, 250-3, etc. SAN component gateway 260 reads and interprets network communications from IP router 240 and converts data packet frame communications for use in target group 250.

SAN component gateway 260 couples to a SAN fabric 265. SAN fabric 265 includes any number of interconnecting network devices such as network switches, network routers, network hubs, etc. In one example, SAN fabric 265 may include only network wiring or cable interconnects and thus no discrete network devices. SAN fabric 265 couples to a Fibre Channel (FC) storage network device 270 and an FC storage network device 275. FC storage network devices, such as FC storage network device 270 and FC storage network device 275 provide information in the form of data packets to host devices, such as host 215, and host 220. Host devices may initiate data read and write requests to target group 250 FC storage devices, such as FC storage 270 and FC storage 275. SAN datacenter targets, namely targets 250-1, 250-2, 250-3, etc., may be FC SAN datacenter targets, or FCoE SAN datacenter targets. FC SAN datacenter targets employ Fibre Channel protocol, whereas FCoE SAN datacenter targets employ Fibre Channel over Ethernet protocol. FC storage network devices 270 and 275 may be FC protocol network devices or FCoE protocol network devices, depending on the particular application.

In one example, target 250-1 may be a FC SAN datacenter target that employs Fibre Channel protocol for all communications. In that case, FC storage 270 communicates to SAN fabric 265 across FC pathways using FC protocol. In another example, target 250-1 may be an FCoE SAN datacenter target that employs Fibre Channel over Ethernet protocol communications. In that case, FC storage 270 communicates to SAN fabric 265 across Ethernet pathways using FCoE protocol and communications. Network system 200 employs network devices that provide communication pathways and interface controls for data packet communications between network devices of initiator group 210 and network devices of target group 250. The primary source of data communication is data packet or frame transmission between network devices of network system 200. In one embodiment, host 215 communicates with Ethernet fabric 225 and Ethernet component gateway 230 by employing an FCoE data packet 280. In the opposite direction, Ethernet component gateway 230 communicates with host 215 through Ethernet fabric 225 by employing an FCoE data packet 282.

Network devices of target group 250 may respond to communication requests from network devices of initiator group 210. In that case, IP pathway 264 provides an IP communications pathway for routing data packet communications between initiator group 210 and target group 250. In one embodiment, network system 200 employs an FCIP data packet 285 for communication between Ethernet component gateway 230 and SAN component gateway 260. In response to communication requests from initiator group 210, SAN component gateway 260 communicates through IP router 240 to Ethernet component gateway 230 with an FCIP data packet 287. Within target group 250, and more specifically within target 250-1, SAN component gateway 260 communicates through SAN fabric 265 to FC storage 270 with a SAN data packet 290. FC storage 270 communicates through SAN fabric 265, of target 250-1, to SAN component gateway 260 with a SAN data packet 292. In one example, SAN data packet 290 and SAN data packet 292 are in the form of FC protocol data packets in an FC SAN datacenter target, such as target 250-1. In another example, SAN data packet 290 and SAN data packet 292 are in the form of FCoE data packets in an FCoE SAN datacenter target, such as target 250-1.

Ethernet component gateway 230 provides the methodology and apparatus to convert an FCoE network data packet, such as FCoE data packet 280, to a resultant FCIP network data packet, such as FCIP data packet 285. In one embodiment, host 215 generates FCoE data packet 280. In response, Ethernet component gateway 230 generates and routes or sends the resultant FCIP data packet 285 to IP router 240. IP router 240 sends the resultant FCIP network data packet 285 to SAN component gateway 260 of target group 250. SAN component gateway 260 converts FCIP data packet 285 to an FC or FCoE network data packet, such as SAN data packet 290, for use within target group 250. SAN component gateway 260 sends SAN data packet 290 to SAN fabric 265. SAN fabric 265 sends SAN data packet 290 to one of multiple FC storage devices, such as FC storage 270.

SAN component gateway 260 provides the methodology and apparatus to convert either an FC or FCoE data packet, such as SAN data packet 292, to an FCIP network data packet, such as FCIP data packet 287. In one embodiment, FC storage 270 generates SAN data packet 292. From SAN data packet 292, SAN component gateway 260 generates and routes or sends the resultant FCIP data packet, such as FCIP data packet 287, to IP router 240. IP router 240 sends FCIP data packet 287 to Ethernet component gateway 230 of initiator group 210. Ethernet component gateway 230 converts FCIP data packet 287 to an FCoE network data packet, such as FCoE data packet 282, for use within initiator group 210. Ethernet component gateway 230 sends FCoE data packet 282 through Ethernet fabric 225, to one of multiple host server devices, such as host 215.

Network system 200 employs Ethernet component gateway 230 and SAN component gateway 260 to convert, translate, or otherwise modify network data packets. Ethernet component gateway 230 and SAN component gateway 260 modify network data packets in real time and route such modified data packets to the proper network device of network system 200 in accordance with the appropriate network protocol. Communication or transfer of network data from Ethernet devices such as host 215 to FC devices such as FC storage 270 requires FCIP, FCoE or other network protocol data packet translation. In the particular example of FIG. 2, Ethernet component gateway 230 acts as the translation mechanism for the transfer of data between FCoE protocol and FCIP network data structures. Ethernet component gateway 230 provides translation from FCoE to FCIP during transmission of data packets from initiator group 210 to target group 250. In the particular example of FIG. 2, SAN component gateway 260 acts as the translation mechanism for the transfer of data from FCIP data communications protocol to FC or FCoE protocol. SAN component gateway 260 employs FC or FCoE protocol for the generation of SAN data packets, such as SAN data packet 290.

Figure 3A:
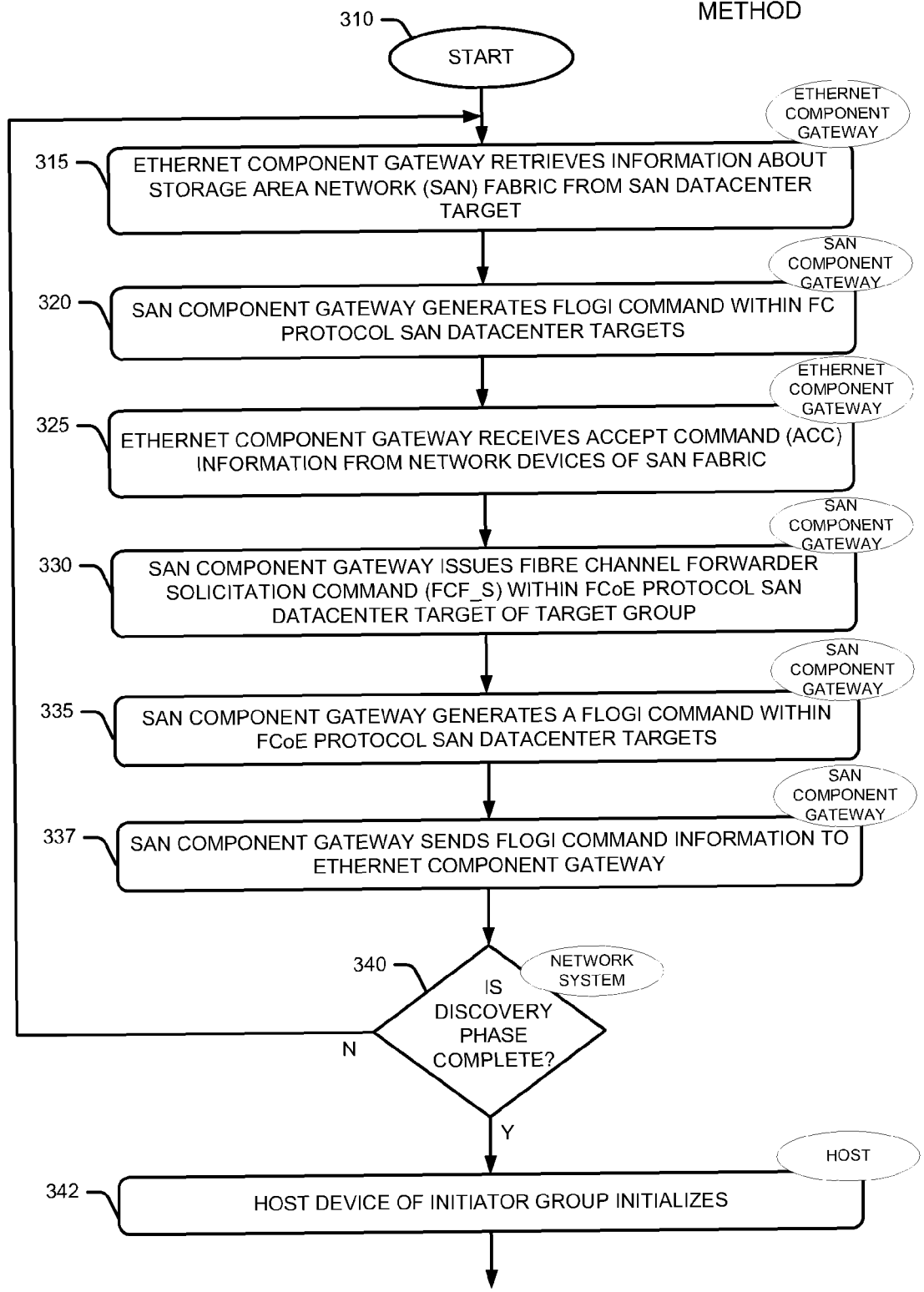

FIGS. 3A-3C show a flowchart that depicts process flow in the network system 200 that employs the disclosed initiator group to target group data packet conversion methodology. Network system 200 provides conversion of Fibre Channel over Ethernet (FCoE) to Fibre Channel over Internet Protocol (FCIP) data packet protocol. In more detail, FIG. 3 depicts the transfer of network data from initiator group 210 to target group 250 using the disclosed conversion methodology. Process flow begins at start block 310. Ethernet component gateway 230 responds as an Ethernet device, such as an Ethernet switch, to network communication requests from devices of initiator group 210. In other words, to any particular network device within initiator group 210, Ethernet component gateway 230 emulates Ethernet switch characteristics. For example, host 215 may desire communication with FC storage 270 and employ the emulation capability of Ethernet component gateway 230 for this purpose. In one example, Ethernet devices within initiator group 210 may communicate with FC storage 270 by using Ethernet protocol network data packets, such as FCoE data packet 280.

Ethernet component gateway 230 may represent or emulate SAN fabric 265 during Fibre Channel communications. To accomplish this, Ethernet component gateway 230 retrieves information about SAN fabric 265 of SAN datacenter target group 250, as per block 315. Ethernet component gateway 230 retrieves switch name, fabric name, and other information from SAN fabric 265. Target group 250 devices, such as FC storage 270 use FLOGI commands to login to SAN fabric 265. Ethernet component gateway 230 retrieves this FLOGI data to capture target group 250 network device information. Ethernet component gateway 230 may retrieve target group 250 device information in a different manner for those SAN datacenter targets, such as target 250-1, that operate with FCoE network protocols. Ethernet component gateway 230 is a "Fibre Channel Forwarder" (FCF) network device of initiator group 210. FCF network devices within FCoE protocol SAN datacenter targets of target group 250 advertise their presence by broadcasting device information such as MAC address, fabric names, device capabilities, and other information across communication pathways of network system 200.

SAN component gateway 260 attaches to target group 250 as an N_PORT device, functioning like a host such as host 215 to any initiator group 210 device. SAN component gateway 260 generates a FLOGI command within any FC SAN datacenter target of target group 250, as per block 320. Ethernet component gateway 230 receives accept command (ACC) information from network devices of SAN fabric 265, as per block 325. Ethernet component gateway 230 uses ACC command data to represent network devices of SAN fabric 265 during communications within network system 200. Within FCoE protocol SAN datacenter targets of target group 250, SAN component gateway 260 issues a Fibre Channel Forwarder Solicitation command (FCF_S), as per block 330. The FCF_S command causes network devices of FCoE SAN datacenter targets of target group 250 to broadcast or advertise their particular network device information. SAN component gateway 260 generates a FLOGI command within FCoE protocol SAN datacenter targets, such as SAN datacenter target 250-1, as per block 335. SAN component gateway 260 sends information of any FLOGI accept (ACC) command information to Ethernet component gateway 230, as per block 337. Ethernet component gateway 230 uses ACC command information to emulate or represent network devices of SAN fabric 265 or other SAN fabric network devices of network system 200.

Network system 200 determines if the network device information discovery phase is complete, as per block 340. If network device information discovery operations are not complete for network system 200, Ethernet component gateway 230 retrieves information again, as per block 315, and the data packet protocol conversion method continues. However, if network system 200 determines that the network device discovery phase is complete, a host device, such as host 215, host 220, or other device initializes, as per block 342. The host initialization may occur within any amount of time after the discovery phase of network device information is complete. In other words, network system 200 may remain in an idle or wait state until one or more hosts, such as host 215, host 220 or other network device initializes.

Prior to any communication from a host device, such as host 215, to a FC storage device, such as FC storage 270, host 215 may discover all potential devices for communication therewith. Host 215 initializes and sends out a Fibre Channel Forwarder Solicitation (FCF_S) command to determine what network devices are available for communication within initiator group 210, as per block 345. Ethernet component gateway 230 responds to the FCF_S command of host 215 by multicasting or unicasting network device information with an FCF_AD command for any known FC SAN fabrics of SAN datacenter target 250, such as SAN fabric 265, as per block 347. In one embodiment, host 215 generates a login request to a particular FC SAN fabric 265 by using the unique MAC address of that particular FC SAN fabric network device of target group 250, as per block 350. In another embodiment, Ethernet component gateway 230 may generate multiple FCF_AD commands, namely one FCF_AD command for each unique MAC address that the SAN component gateway 260 reports.

Host 215 generates a login request by sending an initiating FCoE data packet, such as FCoE data packet 280, to Ethernet component gateway 230. FCoE data packet 280, bound for communication with FC storage 270, includes an FCoE header. Ethernet component gateway 230 removes or strips the FCoE header from FCoE data packet 280 and encapsulates or populates a new modified data packet in accordance with FCIP protocols. In this manner, Ethernet component gateway 230 generates a modified data packet, namely FCIP data packet 285, as per block 352. In one embodiment, a communication from a host device such as host 215 to an FC storage such as FC storage 270 is not a 1 to 1 mapping. In other words, host 215 cannot map or target communications directly to FC storage 270 during any particular data packet transfer or exchange. In one embodiment, target group 250 includes multiple FC storage devices, such as FC storage 270, FC storage 275, or other FC storage device. Ethernet component gateway 230 employs a look up table, namely LUT 232, to properly map communications from one host, such as host 215, to one particular FC storage device, such as FC storage 270. LUT 232 provides address information for each network device that Ethernet component gateway 230 emulates or proxies of target group 250. In this manner Ethernet component gateway 230 may provide communication connectivity to one or multiple network devices of target group 250.

Ethernet component gateway 230 uses LUT 232 to direct FCIP data packet 285, originating from host 215, through IP router 240 to FC storage 270, as per block 355. In one embodiment, target group 250 may employ only one FC storage device. In that particular case, initiator group 210 may not require or employ LUT 232 for device mapping. The FCoE header removal and encapsulation of block 352 and the LUT look-up target operation of block 355 provide a conversion of an FCoE data packet to an FCIP protocol data packet, in one embodiment. SAN component gateway 260 receives FCIP data packet 285 and removes or strips the FCIP header to generate a modified data packet, such as SAN data packet 290, for use within target group 250, as per block 357. This removal of the FCIP header to form the modified data packet of SAN data packet 290 effectively converts the FCIP data packet to the SAN data packet. Target group 250 interrogates FCIP data packet 285 to determine if that particular data packet includes a FLOGI command, as per block 360. If FCIP data packet 285 includes a particular FLOGI command, SAN component gateway 260 translates that particular FLOGI command to a "fabric discovery" (FDISC) command, as per block 362. In this manner, target group 250 generates an N_PORT virtualization or "virtual node port identifier" (VN_PORT_ID) that provides for one network login within network system 200. N_PORT_ID virtualization (NPIV) allows multiple N_PORT_IDs to share a single physical N_PORT. If the FCIP data packet 285 does not include a FLOGI command, or after SAN component FLOGI command translation to FDISC command in per block 362, SAN component gateway 260 sends SAN data packet 290 to FC storage 270 of target group 250, as per block 365.

FC storage 270 receives SAN data packet 290, as per block 367. In more detail, FC storage 270 receives SAN data packet 290 that routes from SAN component gateway 260 and through SAN fabric 265. In one embodiment, FC storage 270 receives a request for information within SAN data packet 290 and responds in return with SAN data packet 292 in the opposite direction. FC storage 270 sends the return data packet, namely SAN data packet 292, through SAN fabric 265 to SAN component gateway 260, as per block 370. SAN component gateway 260 receives and encapsulates SAN data packet 292 in accordance with FCIP protocols to generate an FCIP data packet, such as FCIP data packet 287, as per block 372.

SAN component gateway 260 using LUT 262 for mapping, sends FCIP data packet 287 to a host device, such as host 215 of initiator group 210, as per block 375. SAN component gateway 260 directs the FCIP data packet 287 through IP router 240 to the proper network device, such as host 215, host 220, or other device by means of LUT 262. SAN component gateway 260 may employ LUT 262 to route FCIP data packet 287 to initiator network devices such as initiator network devices 210-1, 210-2, 210-3. In the case wherein initiator group 210 employs only one network device, SAN component gateway 260 does not require and may not employ the LUT 262 mapping feature. Ethernet component gateway 230 receives the return data packet, namely FCIP data packet 287 and extracts FCoE data packet 282 by removing the FCIP header, as per block 380. In one embodiment, FCoE protocol may require mapping or translating to a MAC address the contents of the FCIP data packet 287. Ethernet component gateway 230 encapsulates FCIP data packet 287 in accordance with FCoE protocol rules. Ethernet component gateway 230 generates FCoE data packet 282 and sends FCoE data packet 282 to host 215 of initiator group 210, as per block 385. The data packet from initiator group to target group conversion method ends, as per block 390.

As discussed above, SAN datacenter targets, namely targets 250-1, 250-2, 250-3, etc., may be FC SAN datacenter targets or FCoE SAN datacenter targets. FIG. 4 is a flowchart that depicts a network device discovery method for use within network system 200 when a SAN datacenter target is an FC SAN datacenter target. In contrast, FIG. 5 is a flowchart that depicts a network device discovery method for use within network system 200 when a SAN datacenter target is an FCoE SAN datacenter target.

FIG. 4, as stated above, shows target device discovery methodology when a SAN datacenter target is an FC SAN datacenter target. A SAN datacenter target is an FC SAN datacenter target when FC storage therein, such as FC storage 270, is FC storage of the non FCoE type, namely standard FC or legacy type FC storage. A SAN datacenter target is an FCoE SAN datacenter target when FC storage therein, such as FC storage 270, is FC storage of the FCoE type. In the embodiment of FIG. 4, the network device discovery method targets FC SAN datacenter targets such as FC SAN datacenter target 250-1 of target group 250 wherein target 250-1 is of the non-FCoE type. FC storage network devices in an FC SAN data center target operate using FC network protocols. In contrast, FC storage network devices in an FCoE SAN data center operate using FCoE network protocols. FC SAN datacenter target device method operation begins at start block 410. In this example, initiating network devices, such as host 215, host 220, or other initiators within initiator group 210 require information about target group 250 devices prior to data packet transfer or exchange. For example, host 215, acting as a server, may request data from a particular target or SAN datacenter target storage device, such as FC storage 270. In that case, a discovery of that particular SAN datacenter storage device, namely FC storage 270, occurs prior to data communication from initiator group 210 to target group 250.

Host 215 initializes and sends a Fibre Channel Forwarder Solicitation (FCF_S) command by multicasting data packet 280 to all FCF devices of initiator group 210, as per block 420. Any "Fibre Channel Forwarder" (FCF) network device, gateway or switch of initiator group 210, such as Ethernet component gateway 230, responds with one or more FCF Advertise (FCF_AD) commands, as per block 430. Ethernet component gateway 230 transmits the FCF_AD command to all FCF or soliciting devices of network system 200. FCF network devices respond with switch name, type, and other network device information. Host 215 may receive an FCF_AD command response from multiple target or SAN datacenter target network devices, such as FCF network devices of target group 250.

Host 215 selects one Fibre Channel Forwarder (FCF) device of target group 250, and sends an FLOGI command by employing FCoE data packet 280, as per block 440. Ethernet component gateway 230 receives the FCoE data packet 280 FLOGI command and encapsulates the FLOGI command to form FCIP data packet 285, as per block 445. Ethernet component gateway 230 sends FCIP data packet 285 to SAN component gateway 260, as per block 450. SAN component gateway 260 receives FCIP data packet 285 and generates a "link service accept" (LS_ACC) command with proper N_PORT ID of FC storage 270, as per block 460. SAN component gateway 260 translates an FLOGI command that forms FCIP data packet 285 to generate an FDISC command. SAN component gateway 260 sends the LS_ACC command by employing FCIP data packet 287 to Ethernet component gateway 230 of initiator 210-1, as per block 470. Ethernet component gateway 230 converts FCIP data packet 287 with LS_ACC command into FCoE data packet 282 and sends FCoE data packet 282 to host 215, as per block 480. Host 215 receives FCoE data packet 282 and logs into SAN fabric 265 of target group 250, as per block 490. Ethernet component gateway 230 and SAN component gateway 260 manage any future communications between host 215 and FC storage 270 with proper conversion of data packet protocols. Process flow ends at end block 495.

FIG. 5 is a flowchart that depicts a network device discovery method for use within FCoE SAN datacenters of target group 250. The FCoE SAN datacenter device discovery method operation begins at start block 510. Initiating network devices, such as host 215, host 220, or other initiators within initiator group 210, require information about target group 250 devices prior to data packet transfer or exchange. For example, if host 215 acting as a server requests data from a particular SAN storage device, such as FC storage 270 of target 250-1, a discovery of that particular SAN storage device may occur prior to proper data communication. Host 215 initializes and sends a Fibre Channel Forwarder Solicitation (FCF_S) command by multicasting data packet 280 to all FCF network devices of initiator group 210, as per block 520. Any Fibre Channel Forwarder (FCF) network device, gateway or switch of initiator group 210, such as Ethernet component gateway 230 responds with one or more FCF_AD commands, as per block 530. FCF network devices respond with switch name, type, and other network device information.

Ethernet component gateway 230 receives and encapsulates FCoE data packet 280 FCF_DISC command to form FCIP data packet 285. Ethernet component gateway 230, sends FCIP data packet 285 to SAN component gateway 260, as per block 540. In another embodiment, SAN component gateway 260 does not receive FCF_DISC command information from Ethernet component gateway 230. In that case, Ethernet component gateway 230 responds to network data requests by using information directly from SAN component gateway 260 communications. SAN component gateway 260 receives FCIP data packet 285 and issues an FCF_DISC command within target group 250, as per block 550. Any Fibre Channel Forwarder (FCF) network device, gateway or switch of target group 250 responds with an FCF_AD command, as per block 555. Host 215 selects one FCF of FCoE SAN datacenter target 250-1, and sends a FLOGI command by employing FCoE data packet 280, as per block 560. Ethernet component gateway 230 receives and encapsulates the FCoE data packet 280 FLOGI command to form FCIP data packet 285. Ethernet component gateway 230 sends FCIP data packet 285 to SAN component gateway, as per block 565.

SAN component gateway 260 receives FCIP data packet 285 and generates an LS_ACC command with proper VN_PORT ID of FC storage 270, as per block 570. SAN component gateway 260 sends the LS_ACC command, by employing FCIP data packet 287, to Ethernet component gateway 230 of initiator 210-1, as per block 575. Ethernet component gateway 230 converts FCIP data packet 287 with LS_ACC command to form FCoE data packet 282 and sends FCoE data packet 282 to host 215, as per block 580. Host 215 receives FCoE data packet 282 and logs into SAN fabric 265 as a local Ethernet SAN device, as per block 590. Ethernet component gateway 230 and SAN component gateway 260 manage any future communications between host 215 and FC storage 270 with proper conversion of data packet protocols. The FCoE SAN datacenter target device discovery method ends, as per block 595.

The foregoing discloses a network system that employs a data packet communication protocol conversion methodology from an initiator group network device to a target group network device. Data packet communication protocols include Fibre Channel over Ethernet (FCoE) and Fibre Channel over Internet Protocol (FCIP). In one embodiment, the disclosed method includes converting or translating data packet protocols in real time during the communication or transmission of Fibre Channel (FC) and Fibre Channel over Ethernet network data. In another embodiment, the data packet conversion method from initiator group to target group provides for network device name discovery in a network system. In another embodiment, the data packet conversion method enables a network device in one network system to discover the attributes of another network device in the same or other network system.

Modifications and alternative embodiments of this invention will be apparent to those skilled in the art in view of this description of the invention. Accordingly, this description teaches those skilled in the art the manner of carrying out the invention and is intended to be construed as illustrative only. The forms of the invention shown and described constitute the present embodiments. Persons skilled in the art may make various changes in the shape, size and arrangement of parts. For example, persons skilled in the art may substitute equivalent elements for the elements illustrated and described here. Moreover, persons skilled in the art after having the benefit of this description of the invention may use certain features of the invention independently of the use of other features, without departing from the scope of the invention.

We claim:
1. A method of communicating, comprising:
  discovering, by a first host network device in a Fibre Channel Over Ethernet (FCoE) initiator system, other network devices wherein one of the other network devices is a target network device;
  generating, by the first host network device in the FCoE initiator system, an FCoE data packet;
  designating as the target network device, by the first host network device in the FCoE initiator system, a target Fibre Channel (FC) storage device in a storage area network (SAN) target system, the target network device being a target for the FCoE data packet;

converting, by an Ethernet component gateway in the FCoE initiator system, the FCoE data packet into an FCIP data packet by extracting an FC data packet from the FCoE data packet and encapsulating the FC data packet in the FCIP data packet;

transmitting, by the Ethernet component gateway, the FCIP data packet to the SAN target system via an IP data pathway;

receiving, by a SAN component gateway in the SAN target system, the FCIP data packet, thus providing a received FCIP data packet;

extracting, by the SAN component gateway, a SAN data packet from the received FCIP data packet by removing an FCIP header from the received FCIP packet to provide the extracted SAN data packet; and sending, by the SAN component gateway, the extracted SAN data packet to the target FC storage device via a SAN fabric between the SAN component gateway and the target FC storage device;

wherein the discovering by the first host network device in the FCoE initiator system of other network devices further includes:

logging in, by the target FC storage device, to the SAN fabric thus generating login data including target network device information, the login data further including fabric name and switch name information, and retrieving from the SAN fabric, by the Ethernet component gateway, the login data including target network device information to provide target network device information to the Ethernet component gateway for use by the first host network device in communications between the first host network device and the target FC storage device in accordance with the converting step and the extracting step.

2. The method of claim 1, wherein the converting occurs in real time.

3. The method of claim 1, wherein the extracting occurs in real time.

4. A network system, comprising:

a Fibre Channel Over Ethernet (FCoE) initiator system including a first host network device that generates an FCoE data packet, the FCoE initiator system including an Ethernet component gateway that converts the FCoE data packet into an FCIP data packet by extracting an FC data packet from the FCoE data packet and encapsulating the FC data packet in the FCIP data packet;

a storage area network (SAN) target system including a SAN component gateway and a target FC storage device, the SAN target system further including a SAN fabric that couples the target FC storage device to the SAN component gateway; and an internet protocol (IP) data pathway that couples the FCoE initiator system to the SAN target system and conveys the FCIP data packet from the Ethernet component gateway of the FCoE initiator system to the SAN component gateway of the SAN target system, the FCoE data packet being targeted at the target FC storage device, wherein the SAN component gateway receives the FCIP data packet to provide a received FCIP data packet and extracts a SAN data packet from the received FCIP data packet by removing an FCIP header from the received FCIP packet to provide an extracted SAN data packet, thus providing the extracted SAN data packet to the target FC storage device;

wherein the first host network device in the FCoE initiator system discovers the target FC storage device in the SAN target system by the target FC storage device logging into the SAN fabric to generate login data that includes target network device information, the login data further including fabric name and switch name information, wherein the Ethernet component gateway retrieves the login data from the SAN fabric, to provide target network device information thereto, the login data including target network device information to provide target network device information to the Ethernet component gateway for use by the first host network device in communications between the first host network device and the target FC storage device in accordance with the Ethernet component gateway converting the FCoE data packet into an FCIP data packet and the SAN component gateway extracting a SAN data packet from the FCIP data packet that the SAN component gateway receives from the Ethernet component gateway.

5. The network system of claim 4, wherein the Ethernet component gateway converts the FCoE data packet to the FCIP data packet in real time.

6. The network system of claim 4, wherein the SAN component gateway extracts the SAN data packet from the FCIP data packet in real time.

7. The network system of claim 4, wherein the first host network device discovers other network devices in the SAN storage system, wherein the Ethernet component gateway emulates the other network devices by using SAN component gateway information that the SAN component gateway provides.

8. The network system of claim 4, wherein the IP data pathway comprises an IP router.

* * * * *